INVENTOR.
EDWARD L. ALLEN
BY Charles J. Worth
AGENT

United States Patent Office 3,315,711
Patented Apr. 25, 1967

3,315,711
WIRE WRAPPER
Edward L. Allen, Ulster, Pa., assignor to Ingersoll-Rand Company, New York, N.Y., a corporation of New Jersey
Filed Feb. 28, 1964, Ser. No. 348,228
6 Claims. (Cl. 140—112)

The present invention relates to hand tools for making wire wrapped electrical terminal connections and more particularly for such connections that are soldered.

Wrapped and soldered connections are extensively used in the electrical and electronic industries and presently require two separate operations; a tool being required specific to each of such operations. More specifically, a wire wrapper is used to make the wrapped terminal connection. Then, a soldering tool, such as a torch, iron, or gun is used to solder-lock the wrapped wire.

An object of the present invention is to provide a single tool that is ruggedly and relatively simply constructed for making wrapped and soldered connections.

Another object of the present invention is to provide a tool for making a wire wrapped terminal connection and for providing heat to such connection for soldering.

And, another object of the present invention is to provide the foregoing tool which provides the heat for soldering during the wire wrapping operation.

The present invention contemplates a tool for making a wire wrapped and solder locked terminal connection comprising a housing; a spindle rotatably mounted in the housing; a bit connected to one end of the spindle having an axial bore for receiving a terminal to be wrapped and an axially disposed peripheral groove for receiving the end of a wire to be wrapped, the bit being adapted to wrap a wire end disposed in the peripheral groove on a terminal disposed in the axial groove when the bit is rotated and for heating a terminal and the wire being wrapped thereon when the bit is heated; heating means disposed in the housing adjacent the bit being adapted to receive a flow of electrical energy and converting such energy to heat that is provided to the bit; means operatively connected to the heating means to control flow of electrical energy thereto; and means operatively connected to the end of the spindle opposite from the bit for rotating the spindle to rotate the bit for wrapping.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
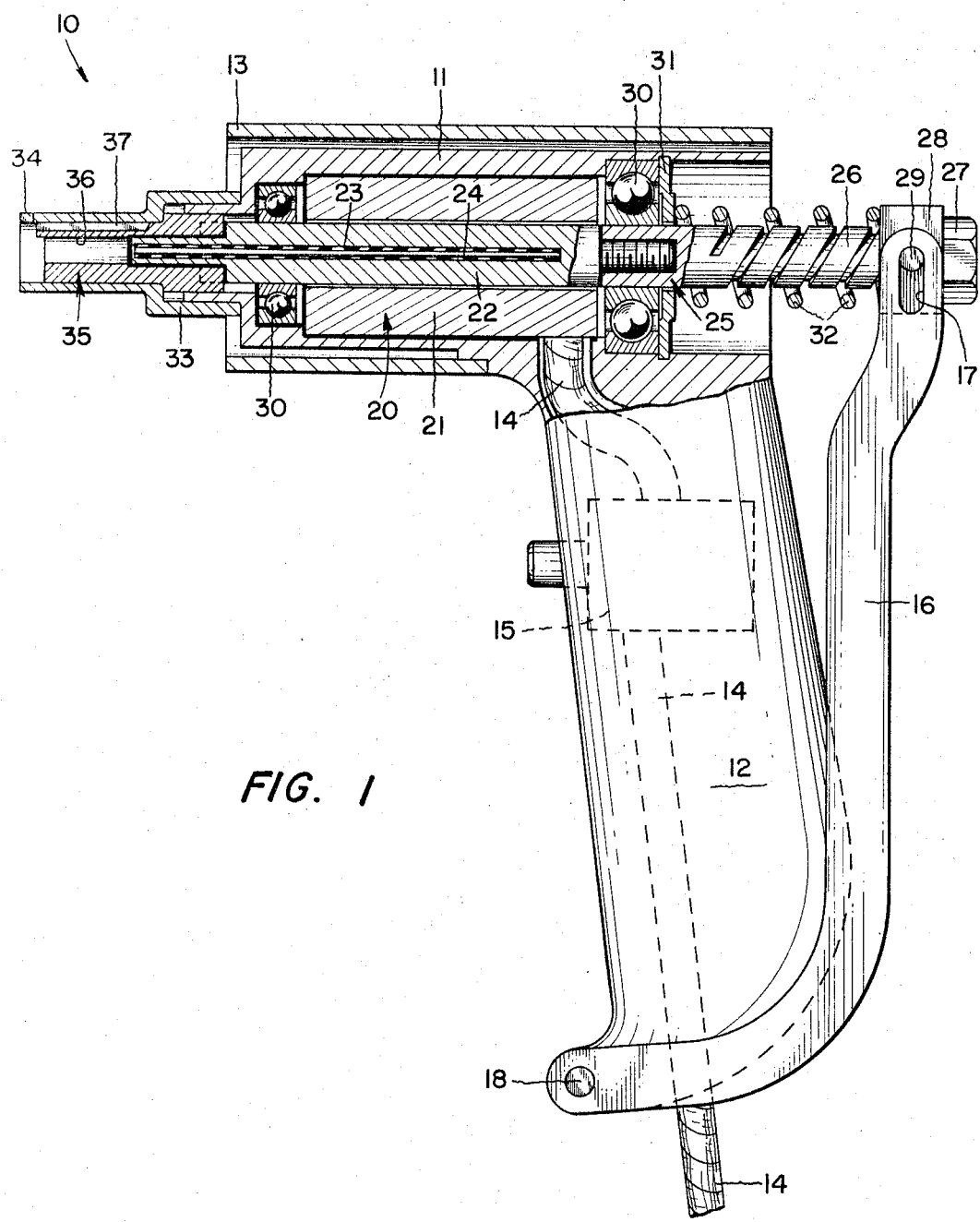
Figure 2:
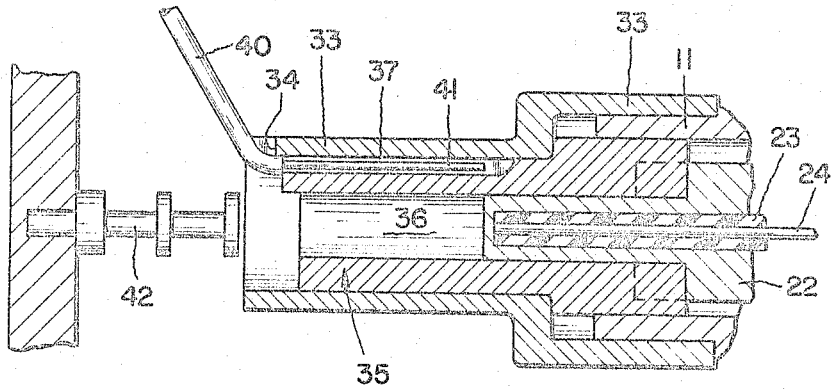
Figure 3:
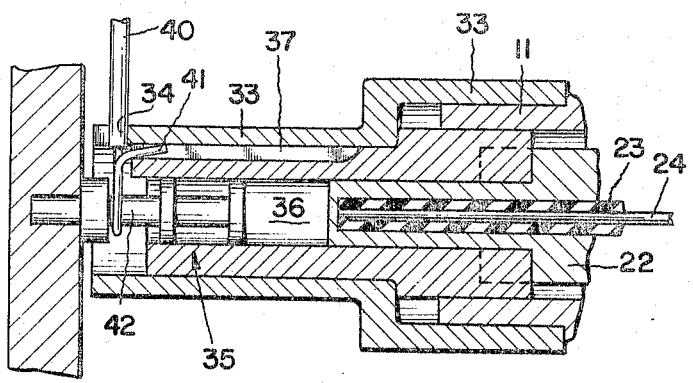
Figure 4:
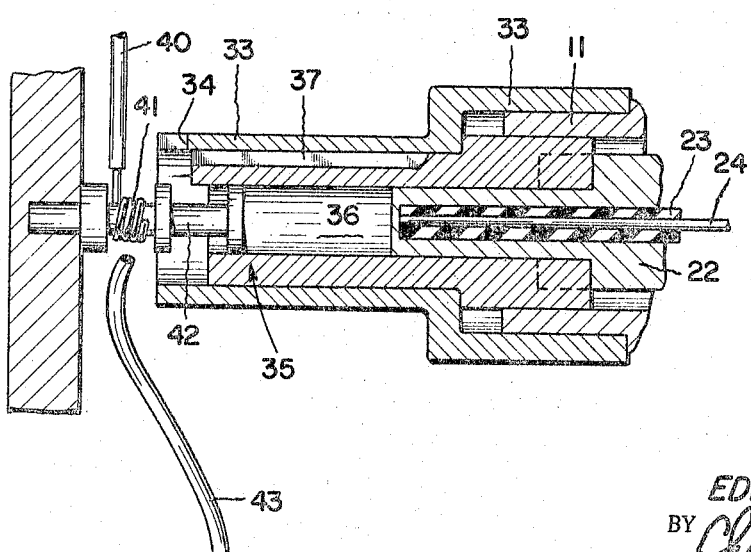

FIG. 1 is an elevational view of a tool made in accordance with the present invention with portions thereof broken away, and FIGS. 2, 3, and 4 are enlarged sectional views of the front end of the novel tool of FIG. 1 illustrating progressive steps in making a soldered wound connection.

Referring now to the drawings, particularly to FIG. 1, a tool 10 made in accordance with the present invention has a housing or casing 11 having a tubular portion encircled in spaced relation by a heat shroud 13 fixed to the casing, and with a handle or grip portion 12. A line 14 adapted to receive electricity from a source (not shown) extends through grip portion 12 and is connected to electrical heating means 20 disposed in the tubular housing portion 11. A switch 15 connected in line 14 is provided in grip portion 12 to control flow of electricity to heating means 20.

Heating means 20, as shown preferably is a transformer having a primary coil 21 fixed in housing 11 and connected to line 14. The secondary 22 of transformer 20 is of solid form having a wire 24 that is embedded in an axially disposed elongated insulation insert 23 and is electrically connected at its ends to the ends of secondary 22. Although not shown, wire 24 and insert 23 may be mounted in housing 11, the wire 24 being connected at its ends by brushes to the ends of secondary 22.

The rearward end of secondary 22 is connected to a spirally threaded shaft member 26 to form a spindle 25 that extends outwardly past the rear end of housing 11 so at least a portion of the threads of member 26 are exposed. A pair of axially spaced bearings 30 are provided in housing 11, each on one side of the primary 21 opposite from the other for rotatably supporting spindle 25.

A keyed collar or nut member 28 is threaded on the end of shaft member 26 and has a pair of outwardly extending pins or trunnions 29 (only one being shown) that are disposed in slots 17 of a bifurcated end of a grip lever 16. Connecting means such as a pin 18 is provided to pivotally connect the other end of lever 16 to grip 12.

Spring means is provided to bias collar 28 rearwardly against a stop 27 which may be a nut or the head of a bolt fixed to the end of member 26. Toward this end, a coil spring 32 encircles member 26 and is disposed between collar 28 and a spring seat 31 in housing 11. It should be understood that this arrangement is intended to illustrate one way of providing spring means, as required, and is not to be construed as defining the limits of the present invention. A spring type hinge (not shown) in place of pin 18 or a spring (not shown) acting between grip 12 and lever 16 would provide the required spring means.

A tubular nose member or sleeve 33 is connected at its rearward end to the forward end of housing 11, and has a notch 34 in its forward end to provide a passage for a wire to be wrapped as will be further discussed. A wire wrapper bit 35 is connected to the forward end of and is rotated by spindle 25. Bit 35 has the usual axial bore 36 and axially disposed peripheral groove 37.

It should be understood that heating means 20 may be modified wherein the primary 21 is a high resistance coil and the secondary 22 forming the spindle 25 in part, is merely a heat transmission member. In such a modified arrangement, the spindle 25 may be made as a single member. It should be further understood that the transformer heating means 20, or the modification thereof, is adequately insulated or electrically isolated in any well known manner to prevent short circuiting, undesirable electrical transmission by the tool, and shocks to an operator when the tool 10 is being handled.

In operation, the novel tool 10 will prepare an electrical connection in accordance with the present invention by wrapping the bared or uninsulated end 41 of a wire 40 on a terminal 42 and by providing sufficient heat for soldering as shown in FIGS. 2, 3, and 4. Switch 15 is closed to energize heating means 20 to provide heat that is transmitted to wrapper bit 35 by the secondary 22. Wire 40 is inserted through notch 34 in sleeve 33 with its bared or uninsulated end 41 to be wrapped, being inserted into the peripheral groove 37 of bit 35.

Tool 10 is then positioned for wrapping wherein a terminal 42 is disposed in axial bore 36 of bit 35 and the uninsulated end 41 of wire 40 is wrapped, in the usual manner, by rotation of the bit. This is accomplished by the tool operator clamping the grip 12 and lever 16 urging collar 28 to move axially against spring 32 on member 26 of spindle 25. Such axial movement of collar 28, which threadedly engages spindle member 26 and is held against rotation, rotates spindle 25; bit 35 rotating with the rotating spindle.

Bit 35 receiving heat from the heating means 20 in turn, transmits heat to the uninsulated wire end 41 when it is inserted in groove 37, and to the terminal 42 when it is inserted into bore 36. Such heating of the wire end 41 and terminal 42 continues until wrapping is completed and tool 10 is removed.

When wrapping is completed, tool 10 is fully or preferably, partially removed and solder 43 is touched to the heated wrapped uninsulated wire 41 and/or terminal 42 to complete the desired connection. Upon release of lever 16, spring 32 will bias collar 28 to its initial position abutting stop 27, and tool 10 is ready for a succeeding wrapping operation.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:
1. A wire wrapper comprising:
   a casing;
   a spindle rotatably mounted in said casing;
   a wire wrapping bit operatively connected to said spindle and adapted to receive a terminal and a wire to be wrapped around said terminal;
   means for rotating said spindle and bit for wrapping said wire around said terminal; and
   electrically energizable means disposed in said casing adjacent said bit for heating said bit to soldering temperature when energized.

2. The wire wrapper of claim 1 wherein said electrically energizable means includes a rotating portion mounted between said spindle and said bit for transmitting the rotation of said spindle to said bit and insulation means between said bit and said rotating portion.

3. The wire wrapper of claim 2 wherein said electrically energizable means is a resistance coil.

4. The wire wrapper of claim 2 wherein said electrically energizable means includes a transformer having a primary coil connected to a source of electrical energy and said rotating portion includes a secondary coil mounted between said spindle and said bit for heating said bit.

5. The wire wrapper of claim 4 further including a tubular shield encircling said casing and spaced from the portion of the casing in which the coil is mounted.

6. The wire wrapper of claim 5 wherein said rotating means is a spring biased lever connected to said spindle.

References Cited by the Examiner
UNITED STATES PATENTS 2,955,769  10/1960  Boswell et al. _____ 242—7
3,098,615   7/1963  Bach et al. _____ 242—7

OTHER REFERENCES

IBM Technical Disclosure Bulletin, vol. 5, No. 10, March 1963.

CHARLES W. LANHAM, *Primary Examiner.*
R. D. GREFE, *Assistant Examiner.*